Nov. 23, 1965  F. W. STEUDLER  3,218,702
METHOD AND APPARATUS FOR BONDING WIRES TO METAL SURFACES
Filed June 9, 1961  3 Sheets-Sheet 1

INVENTOR
FREDERICK W. STEUDLER
BY
Mason, Porter, Diller & Stewart
ATTORNEYS

Nov. 23, 1965 F. W. STEUDLER 3,218,702
METHOD AND APPARATUS FOR BONDING WIRES TO METAL SURFACES
Filed June 9, 1961 3 Sheets-Sheet 2

INVENTOR
FREDERICK W. STEUDLER

BY Mason, Porter, Diller & Stewart
ATTORNEYS

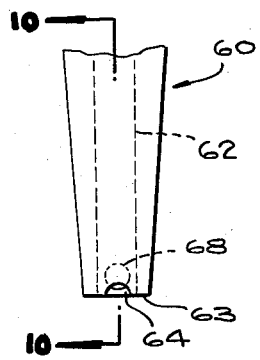
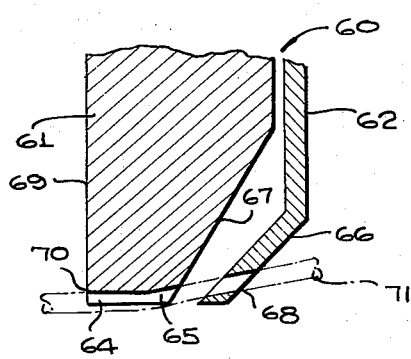
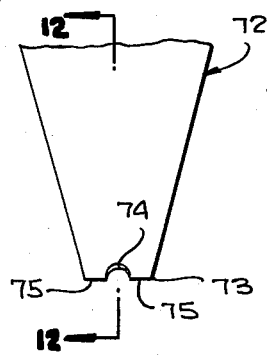
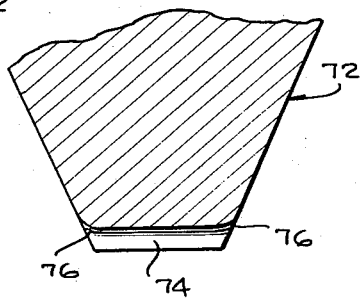
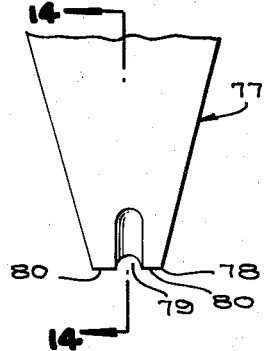
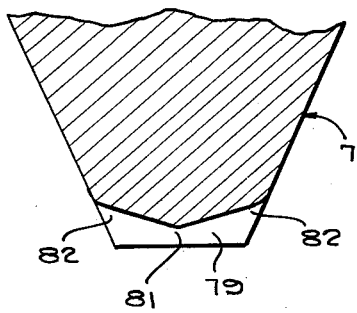
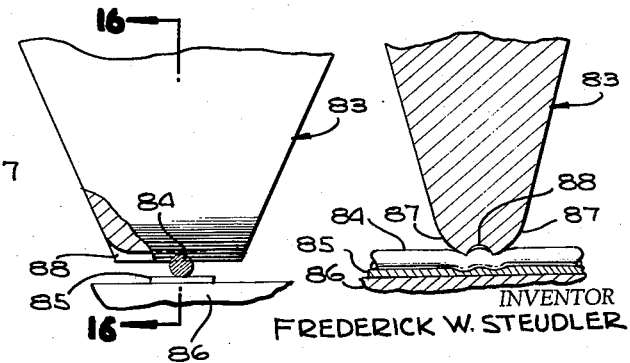

United States Patent Office 3,218,702
Patented Nov. 23, 1965

3,218,702
METHOD AND APPARATUS FOR BONDING
WIRES TO METAL SURFACES
Frederick W. Steudler, 138 Musser Ave., Lancaster, Pa.
Filed June 9, 1961, Ser. No. 116,164
14 Claims. (Cl. 29—470.1)

This invention relates in general to new and useful improvements in the pressure bonding or welding of metal elements, and more particularly relates to the bonding of fine wires formed of precious metals to small metallic areas of electronic components, and the like. In particular, the invention relates to the bonding of wire connectors to metallic areas on transistors wherein the bond is accomplished by a combination of application of pressure and heat.

In the past, in the manufacture of transistors, the crystals of germanium and the like, have small areas thereof coated with metal, the metal being preferably deposited by a vacuum metallizing process. Short lengths of fine wires of precious metals, such as gold and sliver, were then cut off and each length of wire was fed into a small diameter tube which served as a holder. Then, an end of the wire was aligned with the metal coating on the crystal, after which, through the use of a hand tool, the wire overlying the metal on the crystal was placed under pressure to effect the desired pressure bond or weld. This, however, did not always provide for a proper bond in that the portion of the wire on opposite sides of the bonding tool had a tendency to lift up, and the bond was limited to the small area beneath the bonding tool. Further, unless the bonding tool was carefully manipulated, the exteremly fine wire was severed or ruptured.

In view of the foregoing, it is the primary object of this invention to provide a novel bonding tool for use in bonding small diameter wires to metal areas on electronic elements and the like, the bonding tool having a groove therein for receiving at least an upper portion of the wire during the bonding operation so as to prevent the pressing out and flow of the wire to the extent that the wire is severed or unduly weakened during the bonding operation.

Another object of this invention is to provide a novel bonding tool for use in bonding fine wires or strips to metal surfaces on electronic components and the like, the bonding tool including a pressure applying lower end having a wire receiving groove therein and flat surfaces on the opposite sides of the wire receiving groove wherein as a short length of wire is pressure urged towards a metal surface, that portion of a wire projecting below the tool and out of the groove is flattened by its contact with the metal surface and flows outwardly beneath the flat areas of the tool where pressure may be applied to the flat areas and the desired bond accomplished the full width of the flattened portion of the wire.

Still another object of this invention is to provide a novel bonding tool for applying fine wires to metal elements on electronic components and the like, the tool including a wire guide and a wire bonding tool, the wire guide holding the wire which is fed from a spool or the like type of storage, with the wire being aligned with the bonding tool, and the bonding tool being suitable to provide the necessary bond between an end portion of the wire and element, after which the wire is automatically fed by moving the tool relative to the metal element, the bond between the wire and the metal element being sufficient to result in the automatic feeding of the wire.

A further object of this invention is to provide a novel bonding tool which includes means for bonding a fine wire in position with respect to a bonding head, and the bonding head having a sharp corner portion wherein the wire may be severed immediately in advance of the bonding head by merely striking the wire against a terminal post or other available portion of an electronic element on which the bonding operation is taking place so as to sever the wire immediately in advance of the bonding head.

Still another object of this invention is to provide a novel bonding tool which may be used to successively bond a wire to a metal element by first forming a pressure weld or bond between the wire and the metal element, after which the tool is lifted slightly and moved longitudinally of the wire and the bonding operation is repeated to provide for either numerous slightly spaced bond areas or a continuous bond area, as desired.

A still further object of this invention is to provide a novel method of bonding fine wires to metal surfaces comprising the steps of positioning a wire over the metal surface and overlying the wire with a tool having a longitudinal groove therein and flat surfaces on opposite sides thereof, after which the tool is initially depressed to effect an outward flow of the metal of the wire beneath the bonding surfaces on the tool, and further downward pressure with the tool results in the bonding of the flowed metal to the metal surface.

Yet another object of this invention is to provide a novel method of bonding a fine wire to a metal surface, comprising the steps of holding the wire in guided relation with respect to a bonding head, forming an initial bond between the wire and a metal surface, moving the bonding tool and a wire supply with respect to the initial bond to draw out wire from the wire supply, and then repeating the bonding operation.

With the above and other objects in view that will hereinafter appear, the nature of the invention will be more clearly understood by reference to the following detailed description, the appended claims and the several views illustrated in the accompanying drawings:

In the drawings:

FIGURE 9 is a front elevational view of a modified form of bonding tool.

FIGURE 10 is an enlarged fragmentary vertical sectional view taken along the line 10—10 of FIGURE 9 and shows further the details of the bonding tool, a wire being shown in position with respect to the bonding tool by phantom lines.

FIGURE 11 is a fragmentary front view of a lower portion of a hand bonding tool in accordance with this invention.

FIGURE 12 is an enlarged fragmentary vertical sectional view taken along the line 12—12 of FIGURE 11, and shows further the details of the bonding tool.

FIGURE 13 is an enlarged fragmentary front elevational view of the lower portion of another form of hand bonding tool and shows the general outline thereof.

FIGURE 14 is an enlarged fragmentary vertical sectional view taken along the line 14—14 of FIGURE 13, and shows the specific shape of the hand bonding tool for engagement with a wire.

FIGURE 15 is an enlarged fragmentary elevational view of the lower portion of still another form of hand bonding tool and shows the same associated with a wire and a metal element to which the wire is being bonded, a portion of the tool being broken away and shown in section in order to illustrate the details of a groove formed in the bottom portion of the tool.

FIGURE 16 is an enlarged fragmentary vertical sectional view taken along the line 16—16 of FIGURE 15 and shows the specific use of the bonding tool in the bonding of the wire to a metal strip.

Figure 1:
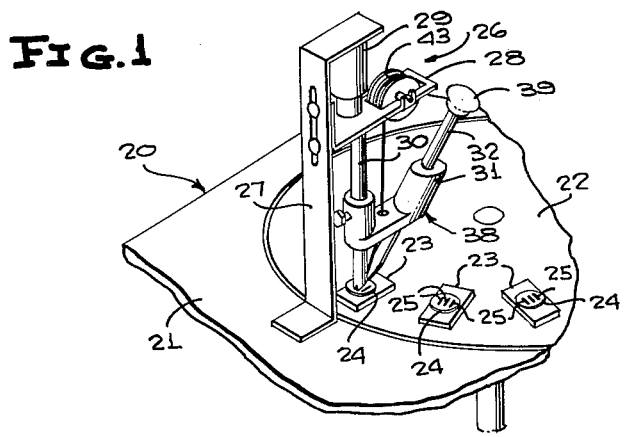
FIGURE 1 is a perspective schematic view showing generally the details of the bonding apparatus which is the subject of this invention as applied to a bonding operation.

Referring now to the drawings in detail, it will be seen that there is illustrated in FIGURE 1 an apparatus for utilizing a bonding tool in accordance with this invention, the apparatus being generally referred to by the numeral 20. The apparatus 20, which is only schematically illustrated, includes a suitable table 21 which carries a turntable 22. The turntable 22 is provided with a plurality of circumferentially spaced supports 23 on which there are illustrated electronic components 24.

The electronic element 24 may be of any type, although this invention particularly relates to the attachment of leads to transistors. Therefore, for purposes of describing the invention, the electronic element 24 may be considered to be a transistor. The transistor will be provided with contacts 25 to which leads are to be bonded in accordance with the invention. The contacts 25 are normally in the form of strips or dots of metal which have been deposited on the transistor element by normally a metal vacuumizing process. Numerous materials may be used for forming the contacts on the transistor element, and these materials may include aluminum. The opposite ends of the leads which are attached to the transistor structure are attached to header terminals (not shown). The leads for the transistor structure are formed of fine wire, normally of precious metal, including gold. The diameter of these fine wires may be as small as 0.0004 inch or less up to generally 0.002 inch or larger. It is necessary that the leads be attached to their respective contacts in alignment therewith so as to prevent any possible bridging between a lead and an adjacent contact which would result in a short. Further, because of the smallness of the contacts and the leads, the leads are pressure bonded or welded to the contacts.

Figure 2:
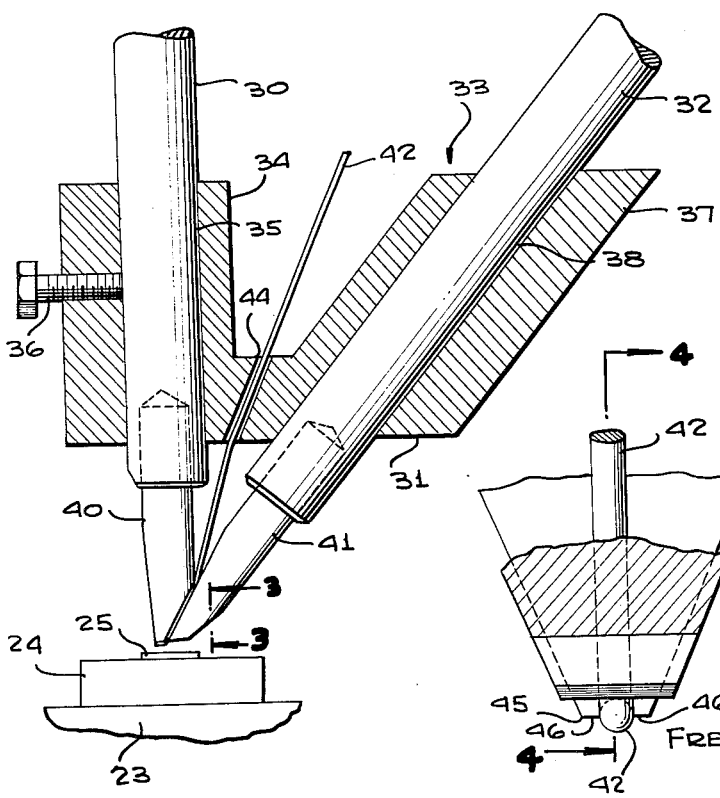
FIGURE 2 is an enlarged fragmentary vertical sectional view taken through the bonding tool of FIGURE 1 and shows the specific details thereof.

The apparatus also includes a bonding unit, generally referred to by the numeral 26. The bonding unit 26 includes a suitable support 27 secured to the table 21 and projecting upwardly therefrom. The support 27 carries a horizontal support 28 which is mounted for vertical movement and may be actuated by means of a suitable cylinder 29. A vertical shaft 30 is carried by the support 28 and has secured thereto a yoke 31. A sloping shaft 32 is also carried by the yoke 31. Generally speaking, the yoke 31 and the shafts 30 and 32 form a bonding tool which is referred to in general by the reference numeral 33 and is best illustrated in FIGURE 2. At this time, it is pointed out that the support 28 may be equally as well attached to the yoke 31.

In FIGURE 2, there is illustrated the specific details of the bonding tool which is, in fact, the novel structure of the invention. The yoke 31 has a first upstanding leg 34 with a bore 35 therethrough, through which the shaft 30 passes. The shaft 30 is secured in adjusted position with respect to the yoke 31 by means of a setscrew 36. The yoke 31 also includes an upwardly sloping leg 37 having a bore 38 therethrough through which the shaft 32 is slidably mounted. The upper end of the shaft 32, as is best shown in FIGURE 1, is provided with a hand knob 39 to facilitate the upward withdrawal of the shaft 32.

The bonding tool 33 includes a bonding tool element 40 which is secured in the lower end of the shaft 30. A guide element 41 is carried on the lower end of the shaft 32 and cooperates with the bonding tool element 40 in the guiding of a wire 42. The wire 42 is carried by a spool 43 (FIGURE 1) which is mounted on the support 28. The wire 42 extends through a bore 44 in the center of the yoke 31 and then extends down between the bonding tool element 40 and the guide element 41.

Figure 3:
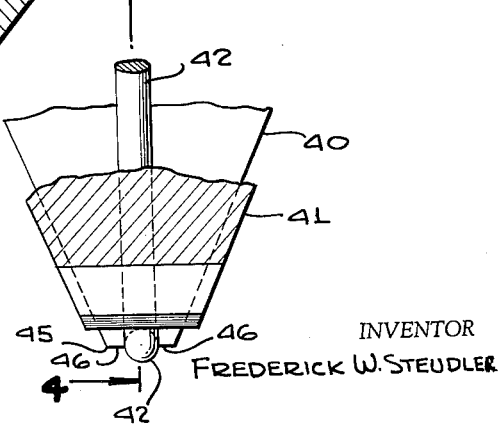
FIGURE 3 is an enlarged fragmentary vertical sectional view taken along the line 3—3 of FIGURE 2 and shows the specific details of the bonding tool member and a guide for the wire associated with the bonding tool member to hold the wire.
Figure 4:
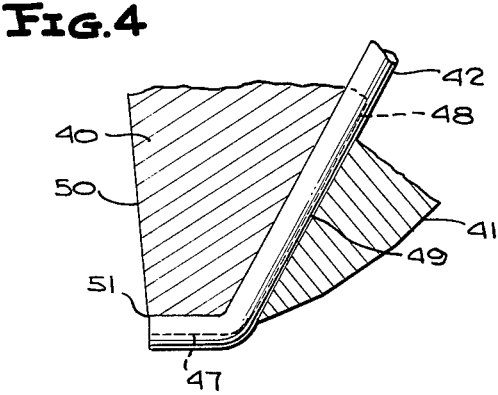
FIGURE 4 is an enlarged fragmentary vertical sectional view taken along the line 4—4 of FIGURE 3, and shows further the relationship of the bonding tool element and the wire guide.

As is best illustrated in FIGURES 3 and 4, the bonding tool element 40 has a flat lower bonding face 45 which includes a pair of lands 46 disposed at opposite sides of the longitudinal groove 47 which is half round in cross-section when the wire 42 is circular in cross-section. Of course, when the wire 42 is of a cross-section other than circular, the cross-section of the groove 47 will be varied accordingly.

The groove 47 extends the full length of the lower bonding surface 45 and terminates at its rear end in an upwardly sloping groove 48 in the rear surface of the bonding tool element 40. The front surface of the guide element 41 is provided with a shallow groove 49, the two grooves 48 and 49 combining to define an opening for snugly, yet not tightly receiving an upwardly sloping portion of the wire 42. At this time, it is pointed out that if the groove 48 is too deep, the wire 42 will shift axially in the groove 47 with the result that the portion of the wire 42 in the groove 47 will be misaligned with the contact 25 on the electronic component 24. On the other hand, if the groove 48 is too shallow, excessive friction can result against the movement of the wire between the surface of the groove 48 and the surface of the guide element 41. Although the guide element 41 has been described as having a groove in the face thereof, it is to be understood that if desired, this groove could be omitted and the wire 42 be engaged with the flush surface or face of the guide element 41. This condition is essentially critical in small wire sizes of 0.0007 inch and below. On the other hand, when wire sizes of 0.0008 inch and above are used, a slight friction may be desired to straighten the wire.

It is to be noted that the angle between the bottom surface of the bonding tool element 40 and a front surface 50 thereof is approximately 95 degrees. This angle permits the formation of a sharp cutting edge, as at 51, to facilitate the cutting off of a portion of the wire 42. This angle has been picked as the optimum angle in that angles greater than 90 degrees offer stronger tools but provide less sharpness for cutting purposes whereas acute angles afford shorter life expectancies. The advantage of the cutting edge 51 is that the fine wire 42 may be struck against a terminal post or the like and easily severed whenever it is desired to sever the wire 42 in the formation of leads.

Figure 5:
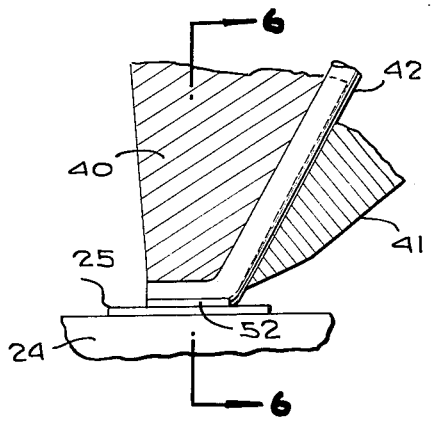
FIGURE 5 is an enlarged fragmentary vertical sectional view similar to FIGURE 4, and shows the wire as it appears immediately after being bonded to a metallic strip or button on a crystal.
Figure 6:
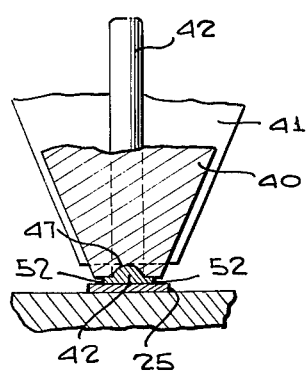
FIGURE 6 is an enlarged fragmentary vertical sectional view taken along the line 6—6 of FIGURE 5 and shows further the details of the deformation of the wire and the bond thereof to the strip.

Reference is now made to FIGURES 5 and 6 in particular, wherein the lower end of the wire 42 is illustrated after being bonded to one of the contacts 25. It is to be noted that when the bonding tool 33 is permitted to be lowered, the pressure exerted on the lower end of the wire 42 is normally sufficient to result in a slight outward flowing of the lower portion of the wire 42 to form wings 52. These wings 52 extend to opposite sides of the main portion of the wire 42 which remains in the groove 47. By properly proportioning the groove 47 and controlling the amount of weight on the bonding tool element 40 and thus controlling the bonding pressure, the amount of outward flowing of the wire 42 to form the wings 52 is held to a minimum. This is highly desirable in that the contacts 25 are closely spaced and bridging between the contacts and shorting must be prevented. In this manner, the thickness of the wings 52 is also controlled. It will be apparent that the pressure necessary to flow the wire 42 in the manner illustrated in FIGURE 6, coupled with the engagement of the wings 52 by the lands 46 of the lower surface of the bonding tool element 40, will be sufficient to pressure bond or weld the wire 42 to the contact 25. Incidentally, it is poined out that the supports 23 may incorporate heaters so that the transistors and the contacts 25 may be preheated so that the bonding is accomplished by means of a combination of pressure and temperature.

Upon carefully considering the bonds illustrated in FIGURES 5 and 6, it will be apparent that the bonding tool element 40 so engages the portion of the wire 42 being bonded as to result in the controlled minimum outward flowing of the lower portion of the wire 42 to form narrow wings 52 and at the same time to provide sufficient pressure on the lower portion of the wire 42 to result in the necessary bond. On the other hand, the shape of the tool element 40 is such that there is no undue pressure on any portion of the wire 42 which will result in the cutting or thinning out of the wire to weaken the wire. Further, pressure is applied to the full length of that portion of the wire engaging the contact so that a complete bond is formed the full length of the contacting surfaces.

If the length of the bond initially formed in the manner illustrated in FIGURES 5 and 6 is not sufficient, the bonding tool 33 will be elevated slightly and the transistor 24 advanced a distance generally equal to the length of the original bond. Then, an additional portion of the wire 42 may be bonded to the contact 25 as is deemed necessary. After the bond has been completed, the bonding tool 33 is elevated a sufficient height to draw out from the spool 43 the desired length of lead. The opposite end of the lead is then bonded to a respective terminal of the header (not shown) of the transistor unit. The wire 42 can then be broken off or severed by striking the wire against a terminal post with the wire being severed by the sharp edge 51.

Figure 7:
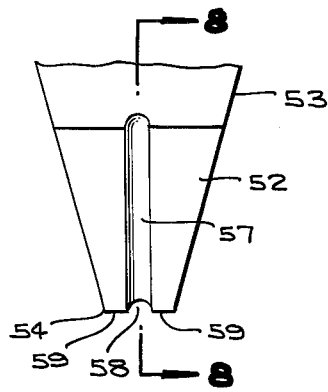
FIGURE 7 is a rear elevational view of a slightly modified form of bonding tool element.
Figure 8:
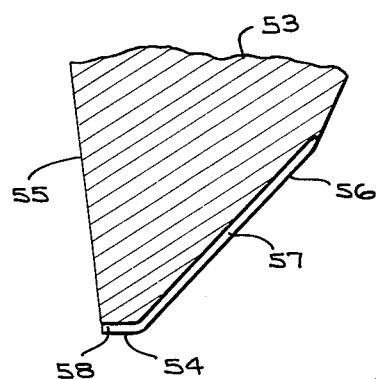
FIGURE 8 is an enlarged fragmentary vertical sectional view taken along the line 8—8 of FIGURE 7 and shows further the details of the bonding tool element of FIGURE 7.

In FIGURES 7 and 8, there is illustrated a modified form of a bonding tool element 53. The bonding tool element 53 is provided with a relatively short lower surface 54 as compared to the lower surface 45 of the tool element 40. The tool element 53 is also provided wtih a front face 55 which may make an angle in excess of 95 degrees with the lower surface 54. Also, the rear surface 56 of the tool element 53 makes a lesser angle with the lower surface 54. The rear surface 56 is provided with a groove 57 corresponding to the groove 48, and the lower surface 54 is provided with a groove 58 corresponding to the groove 47. The lower surface 54 has lands 59 disposed on opposite sides of the groove 58.

Referring now to FIGURES 9 and 10, it will be seen that there is illustrated a modified form of bonding tool, generally referred to by the numeral 60. The bonding tool 60 includes a tool element 61 and a guide element 62. The tool element has a flat lower surface 63 which corresponds generally to the flat lower surface of the tool element 40. A groove 64 extends longitudinally through the flat lower surface 63 and terminates in an upwardly and rearwardly sloping portion 65. The guide element 62 includes a lower sloping leg 66 which closely underlies and is disposed rearwardly of an upwardly sloping rear face 67 of the tool element 61. The leg 66 has a bore 68 therethrough aligned with the rear portion 65 of the groove 64. A front face 69 on the tool element 61 is disposed in angular relation to the lower surface 63 to define a sharp cutting edge 70 like the cutting edge 51. A wire 71 is guided through the guide element 62 and is maintained within the groove 64 at all times.

The use of the bonding tool 60 will be the same as that described with respect to the bonding tool 33, and the wire 71 will be provided on a suitable spool (not shown).

This invention is not limited to a tool which automatically provides for the feeding and holding of the wire to be bonded to a contact, such as one of the contacts 25. The principles of construction embodied in the bonding tool 33, particularly those of the tool element 40, may also be incorporated in a hand tool. This is particularly shown in a hand bonding tool 72 illustrated in FIGURES 11 and 12. Only the rear portion of the bonding tool 72 is illustrated. It is to be noted that the bonding tool 72 tapers downwardly both from side to side and from front to back. The bonding tool 72 has a flat lower pressure applying surface 73 which is interrupted by a longitudinally extending groove 74. The lower surface 73 is in the form of parallel lands 75 disposed on opposite sides of the groove 74. It is also to be noted that the groove 74 has enlarged end portions 76.

It is to be understood that the groove 74 will have a cross-section substantially equal to the upper half of the cross-section of the lead or wire being applied. The lead or wire will have that portion which is to be bonded to a contact 25, for example, positioned in known manner in overlying aligned relation to the contact 25. The bonding tool 72 is then utilized to apply the necessary pressure to properly bond the wire to the contact 25. This is accomplished by positioning the bonding tool 72 so that the upper portion of the wire or lead is positioned within the groove 74, and then applying a downward pressure. This pressure on the wire will result in the outward flowing of the wire to form wings in the manner illustrated in FIGURES 5 and 6, and the wire will be deformed in the same manner illustrated in FIGURES 5 and 6, after which it will be pressure bonded to the contact 25. Since the use of the bonding tool 72, as far as the bonding operation is concerned, is the same as that of the tool element 40, no further description of the use of the bonding tool 72 is believed to be necessary.

In FIGURES 13 and 14, there is illustrated a slightly modified form of bonding tool 77. The bonding tool 17 has the same outline as the bonding tool 72. It is downwardly tapered both from side to side and from front to back. It also has a flat lower pressure applying surface 78 with a longitudinal groove 79 extending down the center thereof to define two spaced pressure applying lands 80. The bonding tool 77 differs from the bonding tool 72 only in the configuration of the grooves 79, which configuration is best illustrated in FIGURE 14. The groove 79 is of a maximum height, as at 81 in the center of the tool 77. The height of the groove 79 increases upwardly towards the opposite ends of the groove 79, as at 82. It will be apparent that the design of the groove 79 will vary the pressure application on the lead or wire during the bonding operation.

At this time, it is pointed out that the groove configurations of the tool elements 40 and 60 and the bonding tool 72 and 77 are only few of the possible groove designs. The groove design will vary depending upon the length and type of contact, the wire size and the metals of the wires and the contacts. Also, it is pointed out that all of the grooves may vary in cross-section, depending upon the cross-section of the wires being applied.

In FIGURES 15 and 16, there is illustrated a slightly modified form of hand bonding tool, generally referred to by the numeral 83. The hand bonding tool 83 as illustrated in conjunction with a wire 84 which is being bonded to a contact 85 of an electronic component 86 which may be a transistor.

The bonding tool 83 has a lower end which is tapered from opposite sides and in side elevation has the same general appearance as the bonding tools 72 and 77. However, in cross-section, it will be apparent that the lower portion of the bonding tool 83 is transversely curved, as at 87. Because of the transverse curvature of the bonding tool 83 and the longitudinal groove 88 formed therein, the bonding tool 83 does not truly have an undersurface, the sides of the bonding tool 83 terminating at the opposite edges of the recess 88.

In the use of the bonding tool 83, the tool 83 is not oriented so that the groove 88 is disposed longitudinally of the wire 84. Instead, the groove 88 is disposed transversely of the wire 84 and a downward pressure is applied on the bonding tool 83 to provide a localized bond between the wire 84 and the contact 85. The downward penetration of the bonding tool 83 into the wire 84 is limited by the movement of the wire 84 into the groove 88 and the bottoming of the bonding tool with respect to the wire 84. While the wire will be slightly weakened in the area of the bond, it will not be materially weakened to the extent that it will break. It is to be understood that a plurality of such bonds may be made on a single wire.

It is to be understood that the sizes and shapes of the various tools illustrated and described herein will vary depending upon the materials, the bond strength desired, the thicknesses and diameters of the materials and the like. However, each of the tools is provided with a groove in the underside thereof for receiving a portion of the wire to be bonded so as to limit the downward travel of the bonding tool and thus prevent the undue thinning out of the wire under the bonding pressure. In this manner, the necessary bonding pressure may be applied to form the desired bond between a wire and a contact without unduly severing or weakening the wire.

Although the invention has been described with respect to particular elements and materials, such as transistors and gold and aluminum metals, it is to be understood that the invention is not intended to be so limited. The invention resides in the specific tools and the method of utilizing the tools irrespective of the specific metals and objects involved.

It is also pointed out that while all of the tools are illustrated in upstanding work positions with the wire to be bonded disposed lowermost, the work positions of the tools in most instances will be inverted from those shown in the drawings.

From the foregoing, it will be seen that novel and advantageous provision has been made for carrying out the desired end. However, attention is directed to the fact that additional variations may be made in the example method and apparatus disclosed herein without departing from the spirit and scope of the invention, as defined in the appended claims.

I claim:

1. A bonding tool for pressure bonding fine wires and strips to metal surfaces, said bonding tool having a lower pressure applying surface, and a groove extending along the lower end of said tool and opening through said lower surface, said groove being of a lesser depth than the wires and strips to be bonded, whereby as pressure is applied with the bonding tool a portion of each wire and strip being bonded will engage the surface of the groove and thus limit penetration of the wires and strips by the bonding tool, the groove extending in a direction transversely of the intended direction of use of the tool and transversely of the wire being bonded.

2. The bonding tool of claim 1 wherein the lower portion of said tool is rounded and converges towards the opposite side edges of the groove.

3. A bonding tool particularly adapted for pressure bonding fine wires on the order of 0.002 inch diameter and less and like size strips to generally flat metal surfaces and being capable of use independently of any opposing cooperating work shaping tool, said bonding tool having a lower pressure applying surface, and a groove extending along the lower end of said tool and opening through said lower surface, said groove being of a lesser depth than the wires and strips to be bonded and conforming in cross section to the upper portion of the wire or strip to be bonded utilizing the tool, whereby as pressure is applied with the bonding tool a portion of each wire and strip being bonded will engage the surface of the groove and thus limit penetration of the wires and strips by the bonding tool, said lower pressure applying surface being flat and being in the form of two narrow lands extending along opposite sides of the groove for limiting the transverse flow of the metal of the wire strip and thereby effect a longitudinal flow of the metal, and the groove extending longitudinally of said lower surface for receiving wires and strips substantially the full length of the groove and permitting the longitudinal flow of the metal.

4. The bonding tool of claim 3 wherein a cutting edge is disposed at one end of the groove for cutting off wires and strips.

5. The bonding tool of claim 3 wherein said bonding tool has an upwardly directed wire guiding groove intersecting the first mentioned groove at the rear end thereof.

6. A bonding tool particularly adapted for pressure bonding fine wires on the order of 0.002 inch diameter and less and like size strips to generally flat metal surfaces and being capable of use independently of any opposing cooperating work shaping tool, said bonding tool having a lower pressure applying surface, and a groove extending along the lower end of said tool and opening through said lower surface, said groove being of a lesser depth than the wires and strips to be bonded, whereby as pressure is applied with the bonding tool a portion of each wire and strip being bonded will engage the surface of the groove and thus limit penetration of the wires and strips by the bonding tool, said lower pressure applying surface being flat and being in the form of two narrow lands extending along opposite sides of the groove, and the groove extending longitudinally of said lower surface for receiving wires and strips substantially the full length of the groove, the groove having at least one deepened end to permit a progressive application of pressure by the tool.

7. A bonding tool for pressure bonding fine wires and strips to metal surfaces, said bonding tool having a lower pressure applying surface, and a groove extending along the lower end of said tool and opening through said lower surface, said groove being of a lesser depth than the wires and strips to be bonded, whereby as pressure is applied with the bonding tool a portion of each wire and strip being bonded will engage the surface of the groove and thus limit penetration of the wires and strips by the bonding tool, said lower pressure applying surface being flat and being in the form of two lands extending along opposite sides of the groove, and the groove extending longitudinally of said lower surface for receiving wires and strips substantially the full length of the groove, the groove increasing in depth from the center to the ends thereof to permit a progressive application of pressure by the tool.

8. A bonding tool for pressure bonding fine wires and strips to metal surfaces, said bonding tool having a lower pressure applying surface, and a groove extending along the lower end of said tool and opening through said lower surface, said groove being of a lesser depth than the wires and strips to be bonded, whereby as pressure is applied with the bonding tool a portion of each wire and strip being bonded will engage the surface of the groove and thus limit penetration of the wires and strips by the bonding tool, said lower pressure applying surface being flat and being in the form of two lands extending along opposite sides of the groove, and the groove extending longitudinally of said lower surface for receiving wires and strips substantially the full length of the groove, the groove having a main portion of constant depth and increasing in depth at the opposite ends thereof to permit a progressive application of pressure by the tool.

9. A bonding tool for pressure bonding fine wires and strips to metal surfaces, said bonding tool having a lower pressure applying surface, and a groove extending along the lower end of said tool and opening through said lower surface, said groove being of a lesser depth than the wires and strips to be bonded, whereby as pressure is applied with the bonding tool a portion of each wire and strip being bonded will engage the surface of the groove and thus limit penetration of the wires and strips by the bonding tool, said lower pressure applying surface being flat and being in the form of two lands extending along opposite sides of the groove, and the groove extending longitudinally of said lower surface for receiving wires and strips substantially the full length of the groove, a guide for wires and strips positioned adajcent said bonding tool for maintaining wires and strips in alignment with the groove, said bonding tool having an upwardly directed groove intersecting the first mentioned groove at the rear end thereof, and said guide being positioned closely adjacent said upwardly directed groove to hold wires and strips therein.

10. A bonding tool comprising a yoke, a first shaft fixed to said yoke and extending therethrough, a bonding tool element connected to the lower end of said first shaft, said bonding tool element including a lower pressure applying surface and a guide surface, a second shaft carried by said yoke, a guide element carried by said yoke and opposing said guide surface to form in combination therewith a guideway for wires and strip, and spool mounting means above said yoke.

11. The bonding tool of claim 10 wherein said bonding tool element has a groove extending along the lower end thereof and opening through said lower surface, said groove being of a lesser depth than the wires and strips to be bonded, whereby as pressure is applied with the bonding tool a portion of each wire and strip being bonded will engage the surface of the groove and thus limit penetration of the wires and strips by the bonding tool.

12. The bonding tool of claim 11 wherein said lower pressure applying surface is flat and is in the form of two lands extending along opposite sides of the groove, and the groove extending longitudinally of said lower surface for receiving wires and strips substantially the full length of the groove.

13. The bonding tool of claim 11 wherein said guide surface has a guideway therein forming a continuation of said groove.

14. A method of pressure bonding fine metal wires on the order of 0.002 inch diameter and less and like sized strips to one of a plurality of closely adjacent narrow, generally flat metal surfaces comprising the steps of applying pressure to an upper portion of a wire on the order of 0.002 inch diameter and less while confining the upper portion of the wire against spreading to cause a controlled transverse spreading of the lower portion of the wire against the one metal surface short of contact with an adjacent one of the metal surfaces, and simultaneously with the spreading of the wire lower portion applying a bonding pressure thereto to bond the spread portion of the wire to the one metal surface.

References Cited by the Examiner

UNITED STATES PATENTS

| | | | |
|---|---|---|---|
| 576,069 | 1/1897 | Perry | 78—82 |
| 1,478,813 | 12/1923 | Becker | 113—94 |
| 2,454,875 | 11/1948 | Hyde | 113—105 |
| 2,639,634 | 5/1953 | Sowter | 78—82 |
| 2,701,483 | 2/1955 | Foxon et al. | 29—470.1 |
| 2,707,823 | 5/1955 | Sowter | 29—470.1 |
| 2,763,057 | 9/1956 | Clair Jr. | 29—470.1 |
| 2,815,689 | 12/1957 | Barnes | 78—82 |
| 3,037,108 | 5/1962 | Poillevey | 219—56 |
| 3,056,317 | 10/1962 | Huber | 78—92 |
| 3,083,595 | 4/1963 | Frank | 78—82 |
| 3,087,239 | 4/1963 | Clagett | 29—497.5 |

FOREIGN PATENTS 891,956  10/1953  Germany.

CHARLES W. LANHAM, *Primary Examiner.*

JOHN P. CAMPBELL, WILLIAM J. STEPHENSON,
*Examiners.*